US009213838B2

(12) United States Patent
Lu

(10) Patent No.: US 9,213,838 B2
(45) Date of Patent: Dec. 15, 2015

(54) SYSTEMS AND METHODS OF PROCESSING DATA ASSOCIATED WITH DETECTION AND/OR HANDLING OF MALWARE

(75) Inventor: Lixin Lu, Saratoga, CA (US)

(73) Assignee: MCAFEE IRELAND HOLDINGS LIMITED, Dublin (IE)

( * ) Notice: Subject to any disclaimer, the term of this patent is extended or adjusted under 35 U.S.C. 154(b) by 47 days.

(21) Appl. No.: 13/594,702

(22) Filed: Aug. 24, 2012

(65) Prior Publication Data

US 2013/0091571 A1 Apr. 11, 2013

Related U.S. Application Data

(63) Continuation of application No. PCT/US2011/036553, filed on May 13, 2011.

(51) Int. Cl.
*G06F 11/00* (2006.01)
*G06F 21/56* (2013.01)
*G06F 21/55* (2013.01)

(52) U.S. Cl.
CPC .......... *G06F 21/563* (2013.01); *G06F 21/552* (2013.01); *G06F 21/561* (2013.01); *G06F 21/562* (2013.01); *G06F 21/566* (2013.01)

(58) Field of Classification Search
CPC ... G06F 21/566; G06F 21/563; G06F 21/126; G06F 21/53; G06F 21/561; G06F 21/56; G06F 21/562; G06F 21/552
USPC ....................................... 726/22–24; 713/188
See application file for complete search history.

(56) References Cited

U.S. PATENT DOCUMENTS

| 5,987,610 | A | 11/1999 | Franczek et al. | |
| 6,071,317 | A * | 6/2000 | Nagel | 717/128 |
| 6,073,142 | A | 6/2000 | Geiger et al. | |
| 6,460,050 | B1 | 10/2002 | Pace et al. | |
| 7,506,155 | B1 | 3/2009 | Stewart et al. | |
| 8,321,941 | B2 * | 11/2012 | Tuvell et al. | 726/24 |
| 8,418,249 | B1 * | 4/2013 | Nucci et al. | 726/23 |
| 8,464,345 | B2 * | 6/2013 | Satish et al. | 726/23 |
| 8,782,365 | B1 | 7/2014 | Mooring et al. | |

(Continued)

OTHER PUBLICATIONS

Andreas Saebjornsen, Detecting Code Clones in Binary Executables, 2009, ACM, pp. 117-127.*

(Continued)

*Primary Examiner* — Luu Pham
*Assistant Examiner* — Jenise Jackson
(74) *Attorney, Agent, or Firm* — Patent Captial Group

(57) ABSTRACT

The present disclosure relates to malware and, more particularly, towards systems and methods of processing information associated with detecting and handling malware. According to certain illustrative implementations, methods of processing malware are disclosed. Moreover, such methods may include one or more of unpacking and/or decrypting malware samples, dynamically analyzing the samples, disassembling and/or reverse engineering the samples, performing static analysis of the samples, determining latent logic execution path information regarding the samples, classifying the samples, and/or providing intelligent report information regarding the samples.

15 Claims, 15 Drawing Sheets

(56) References Cited

U.S. PATENT DOCUMENTS

| | | | |
|---|---|---|---|
| 2002/0162015 A1* | 10/2002 | Tang | 713/200 |
| 2005/0223238 A1* | 10/2005 | Schmid et al. | 713/188 |
| 2006/0075502 A1* | 4/2006 | Edwards | 726/24 |
| 2006/0230451 A1* | 10/2006 | Kramer et al. | 726/22 |
| 2008/0127336 A1* | 5/2008 | Sun et al. | 726/22 |
| 2008/0222729 A1* | 9/2008 | Chen et al. | 726/24 |
| 2008/0263659 A1* | 10/2008 | Alme | 726/22 |
| 2009/0070459 A1* | 3/2009 | Cho et al. | 709/224 |
| 2009/0099988 A1 | 4/2009 | Stokes et al. | |
| 2009/0288167 A1* | 11/2009 | Freericks et al. | 726/23 |
| 2010/0031353 A1* | 2/2010 | Thomas et al. | 726/22 |
| 2010/0077481 A1 | 3/2010 | Polyakov et al. | |
| 2010/0122343 A1* | 5/2010 | Ghosh et al. | 726/23 |
| 2011/0179484 A1* | 7/2011 | Tuvell et al. | 726/22 |
| 2011/0219451 A1* | 9/2011 | McDougal et al. | 726/23 |
| 2011/0302654 A1* | 12/2011 | Miettinen | 726/23 |
| 2012/0079596 A1* | 3/2012 | Thomas et al. | 726/24 |

OTHER PUBLICATIONS

Seo et al, Detection of Unknown Malicious Codes Based on Group File Charactersitics, 2010, IEEE, pp. 1-6.*

Moser et al., Exploring Multiple Execution Paths for Malware Analysis, IEEE 2007, pp. 1-15.*

Sharif et al, Automatic Reverse Engineering of Malware Emulators, 2009, IEEE, pp. 94-109.*

Marhusin et al, Malicious Code Detection Architecture Inspired by Human Immune System, 2008, IEEE, pp. 312-317.*

PCT International Search Report and Written Opinion in PCT Application Serial No. PCT/US2011/036553 mailed on Dec. 26, 2011.

PCT International Preliminary Report on Patentability / with Written Opinion received for PCT Patent Application No. PCT/US2011/036553 , mailed on Nov. 28, 2013.

* cited by examiner

Fig. 1C: Example of AMIS Implementation Chart
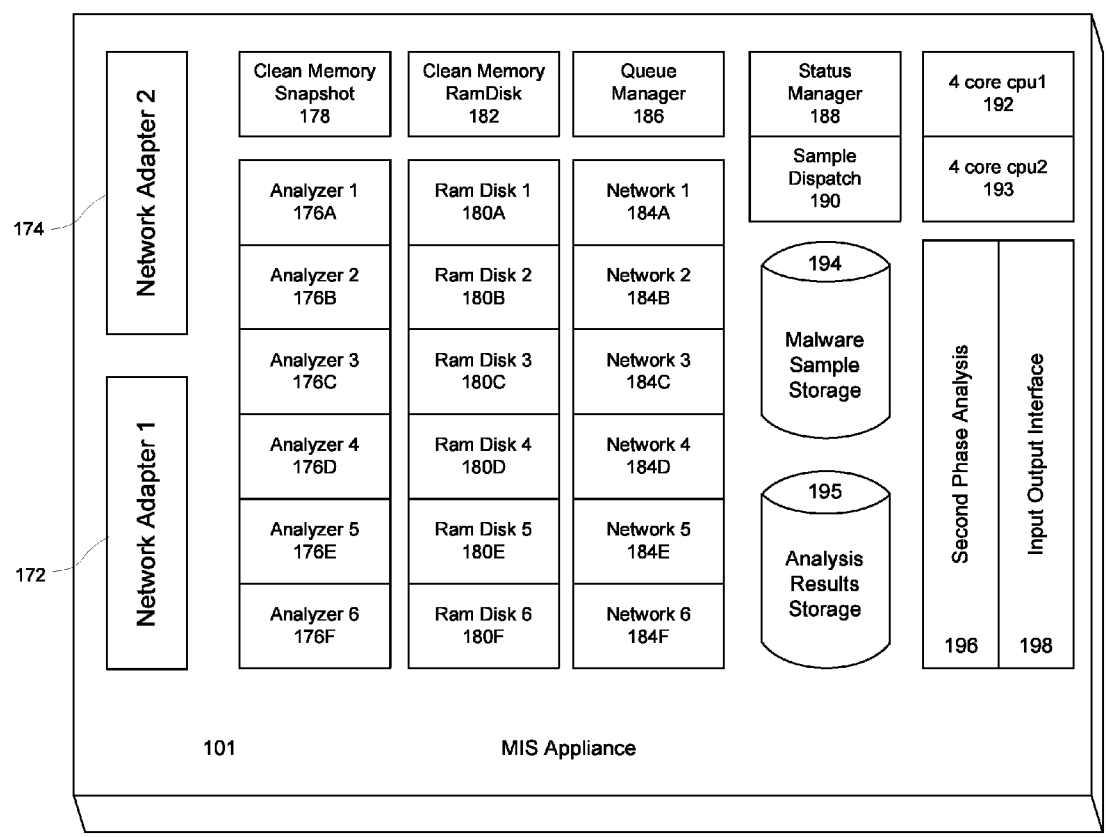

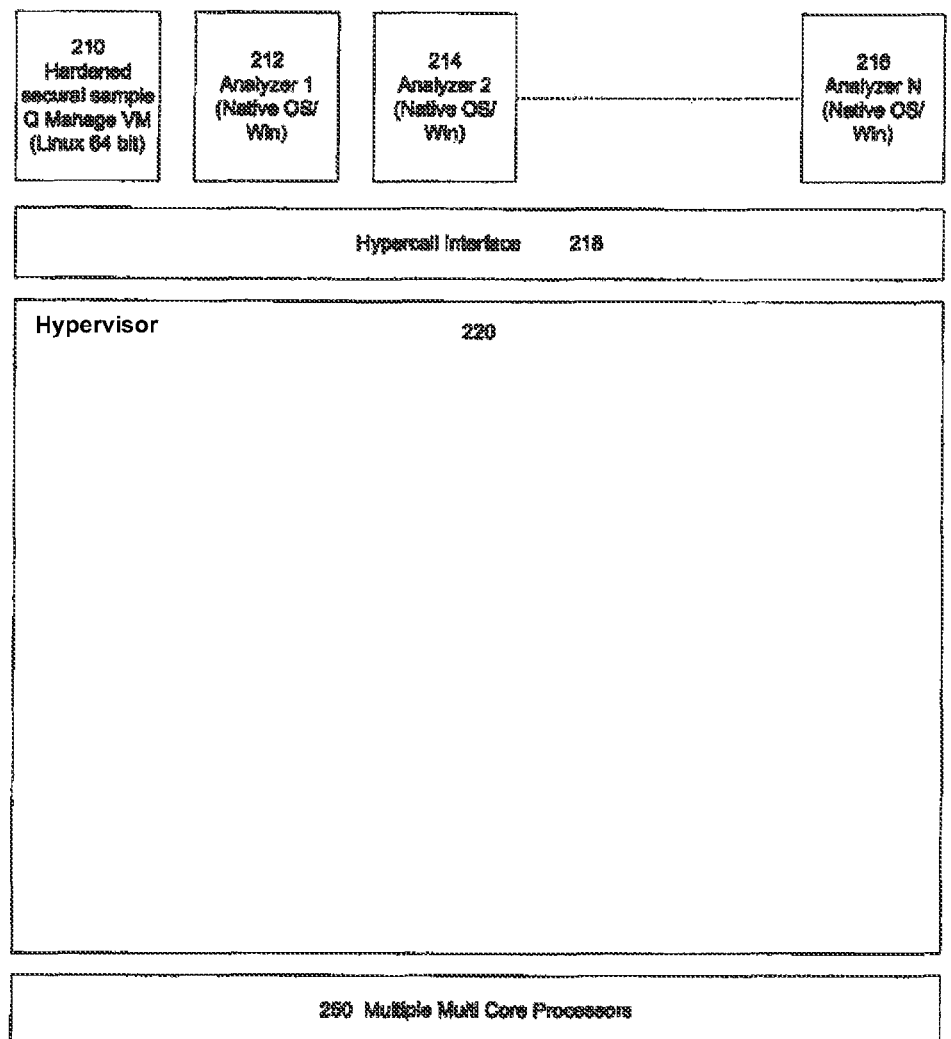

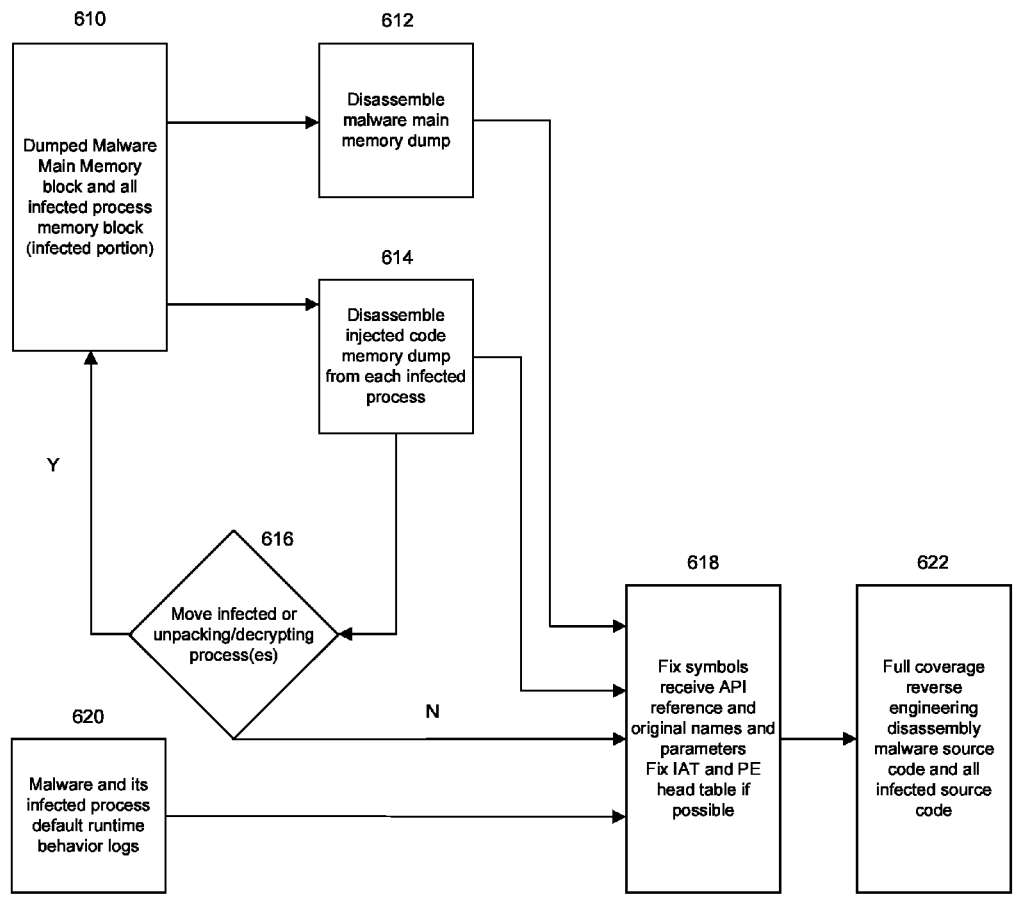
Fig. 6: Malware Reverse Engineering and Disassembly

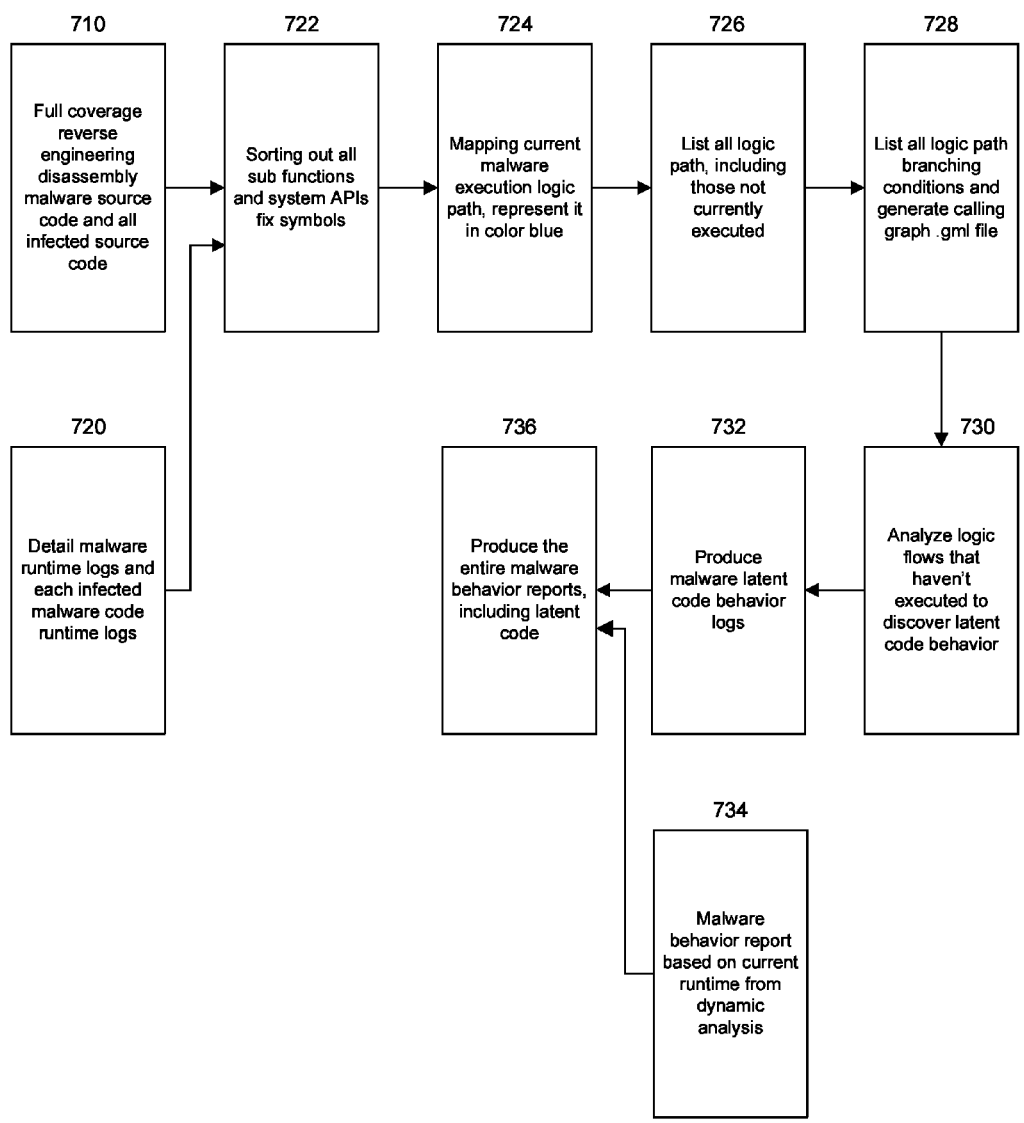
Fig 7: Static Analysis

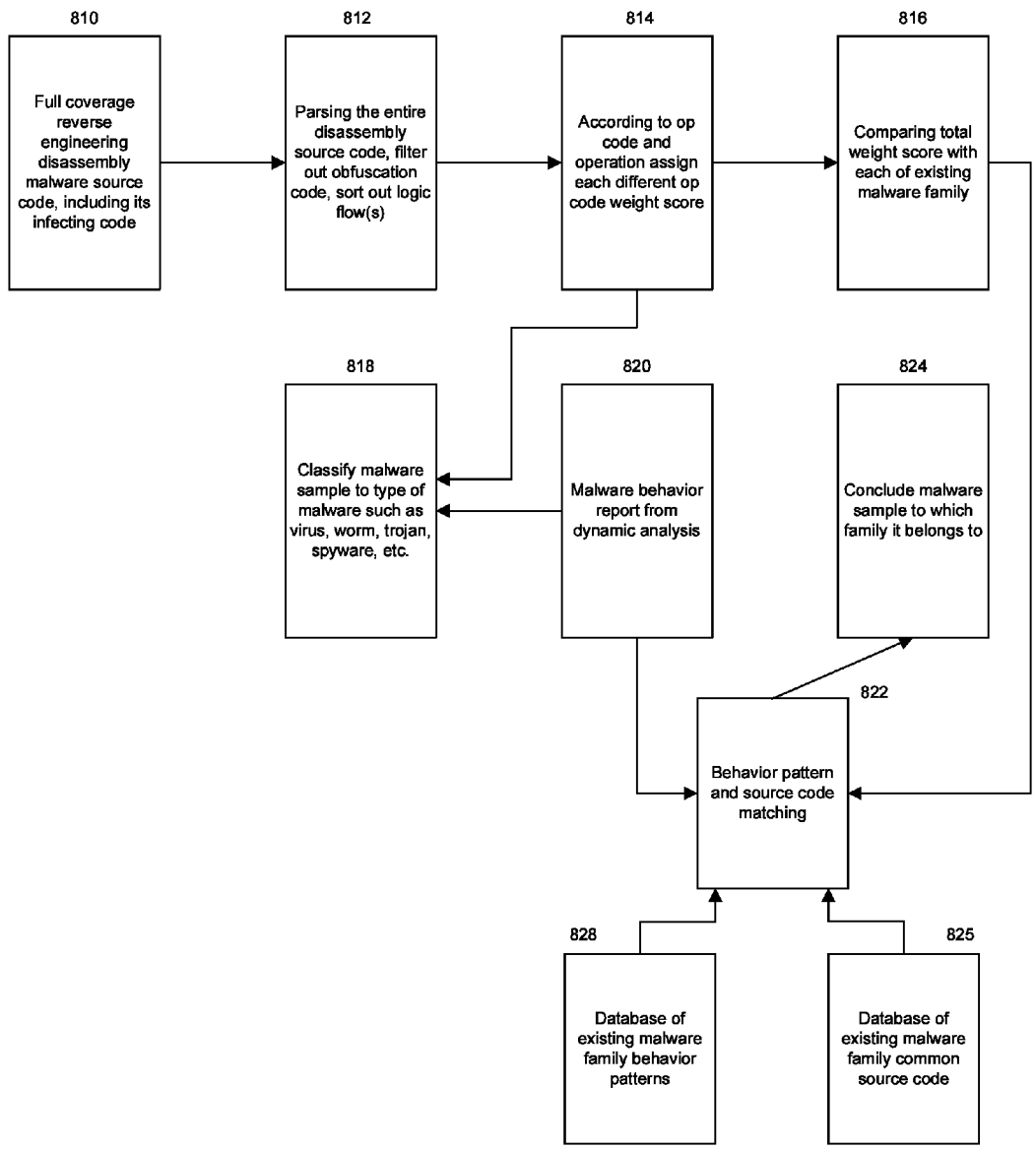
Fig. 8: Malware Classification

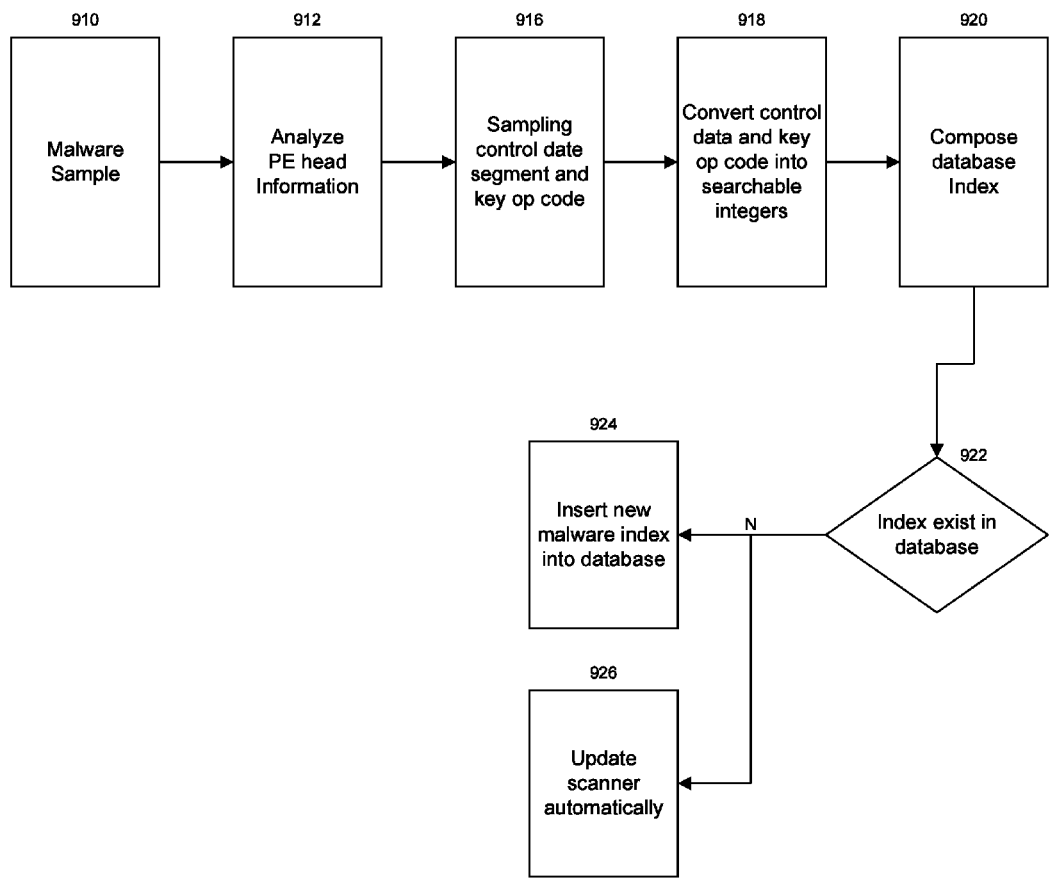
Fig. 9: Malware Signature Abstraction (generation)

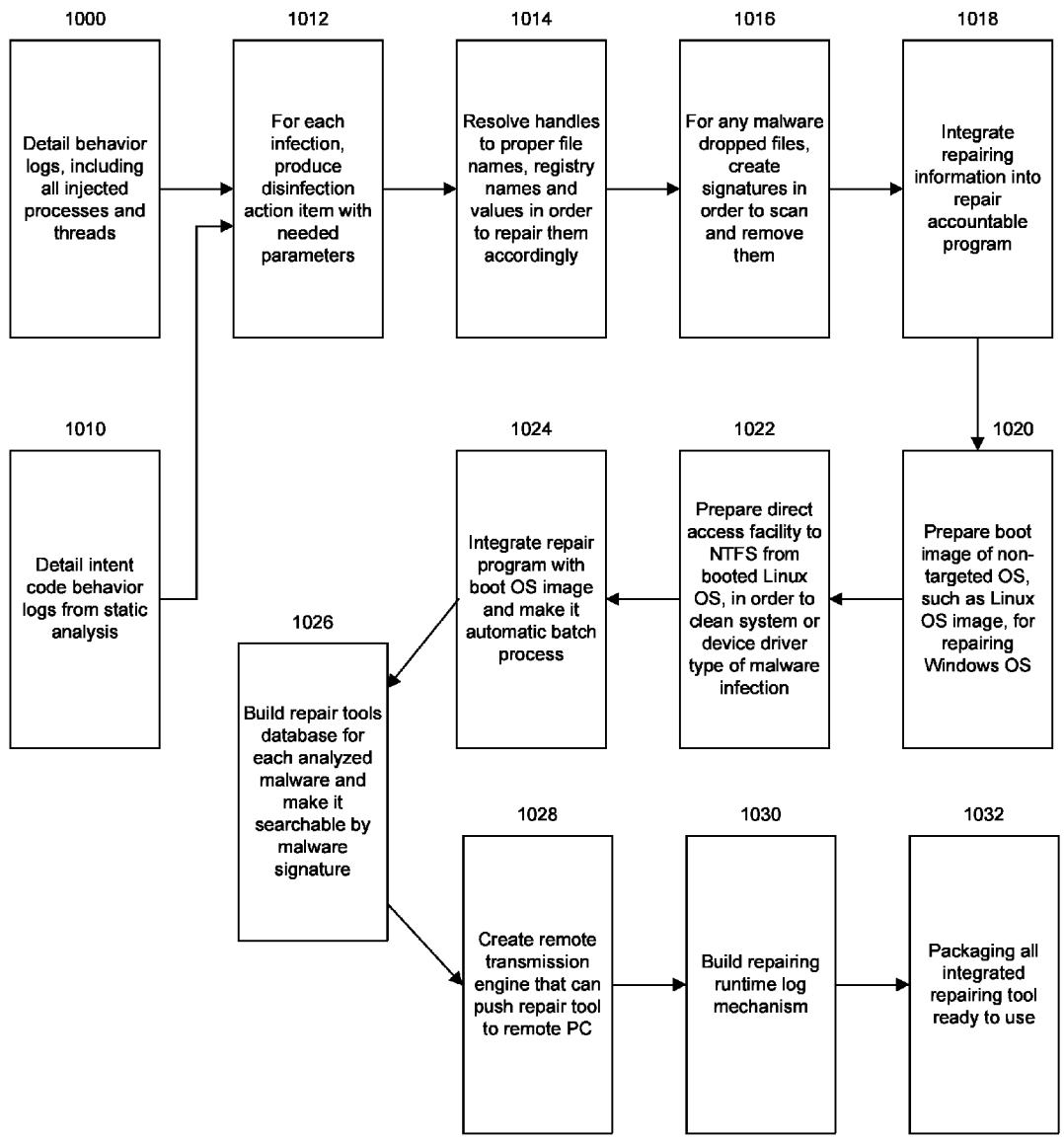
Fig. 10: Produce Repair Tool

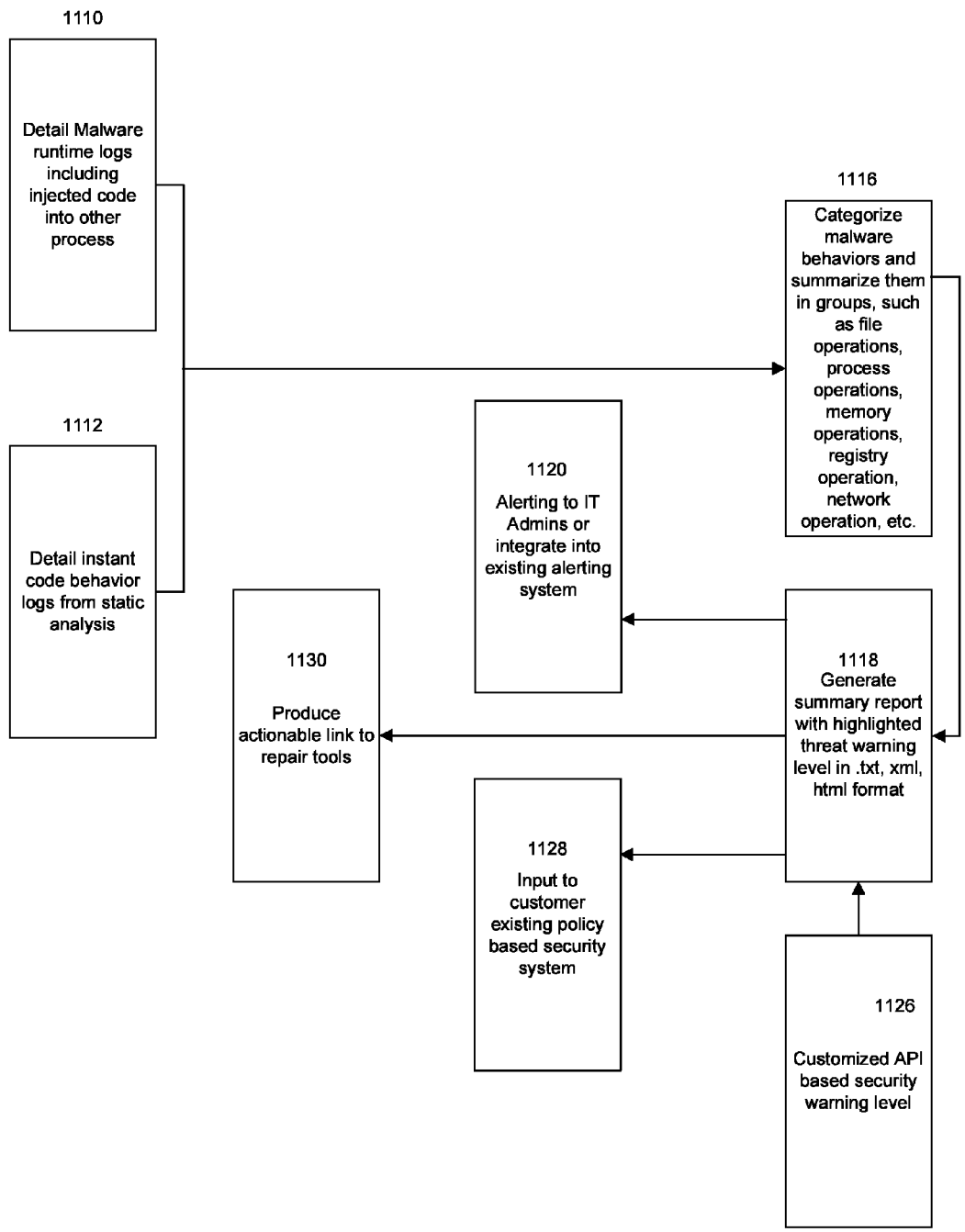
Fig. 11: Intelligent Reporting

SYSTEMS AND METHODS OF PROCESSING DATA ASSOCIATED WITH DETECTION AND/OR HANDLING OF MALWARE

BACKGROUND

1. Field

The present disclosure relates to malware and, more particularly, towards systems and methods of processing information associated with detecting and handling malware.

2. Description of Related Information

Over hundreds of thousands new Malware variants spread over Internet daily. Traditional manual or semi-automated methods can no longer handle malware thread. As such, there are needs for systems and methods that can process malware on this scale, e.g., fully automated systems and methods for handling malware, such as systems that are configured to do one or more of the following: analyze new malware, handle current and latent code logic paths via comprehensive intelligent reports regarding malware, produce signatures of malware, offer adequate repair tool(s), and/or provide solutions at sufficient speed, such as close to the network speed, among others.

BRIEF DESCRIPTION OF THE FIGURES

Reference is made to the attached drawings, wherein elements having the same reference designations represent like elements throughout and wherein:

FIGS. 1A-1C illustrate exemplary block diagrams showing various illustrative systems, platforms, and/or components, according to certain implementations.

FIG. 2 is a diagram illustrating various exemplary aspects of hypervisor layer components and/or features, according to certain implementations.

FIG. 6 is a diagram showing various illustrative aspects of malware reverse engineering/disassembly components and/or features, according to certain implementations.

FIG. 7 is a diagram showing various illustrative aspects of an exemplary static analysis components and/or features, according to certain implementations.

FIG. 8 is a diagram showing various illustrative aspects of exemplary malware classification components and/or features, according to certain implementations.

FIG. 9 is a diagram showing various illustrative aspects of exemplary malware signature generation components and/or features, according to certain implementations.

FIG. 10 is a diagram showing various illustrative aspects of exemplary malware disinfector and repair components and/or features, according to certain implementations.

FIG. 11 is a diagram showing various illustrative aspects of exemplary intelligent reporting components and/or features, according to certain implementations.

DETAILED DESCRIPTION OF ILLUSTRATIVE IMPLEMENTATIONS

Aspects of the present disclosure relate to systems and methods of processing information associated with detecting and handling malware. In some implementations, systems and methods of analyzing executable code or data in the context of detecting and/or handling malware are disclosed. Aspects of the innovations herein pertain to computer software, hardware and firmware, computer virtualization, computer security, network security, Malware analysis, inline and offline network appliance, and anti-malware features. Consistent with this disclosure, systems and methods of analyzing and handling malware via automated and intelligent components and/or processes are provided. Further, the innovations herein may be inline and offline, may analyze malware in real time, and/or produce solutions on the spot, at the location where malware is analyzed.

According to aspects of the present inventions, innovative systems and methods herein may provide 'always on', high speed, secure and safe malware forensic analysis features. In addition to analyzing new malware at high speed, aspects of the inventions herein may include features to reveal/determine any malware's current and latent execution logic paths, and/or otherwise yield information utilizable to uncover malware behavior thoroughly. Further, the present innovations may include or provide comprehensive and/or complete intelligent reports, and reverse engineering of malware disassembly code as well as various code execution call graphs. Systems and methods herein may also be configured to generate malware signatures and provide repair tool features automatically. In some implementations include a built-in universal unpacking engine and decrypt engine, such that systems and methods herein may handle packed or encrypted malware automatically. Further, systems and methods herein may also be installed and/or utilized offline, via offline appliances or functionality.

Figure 1A:
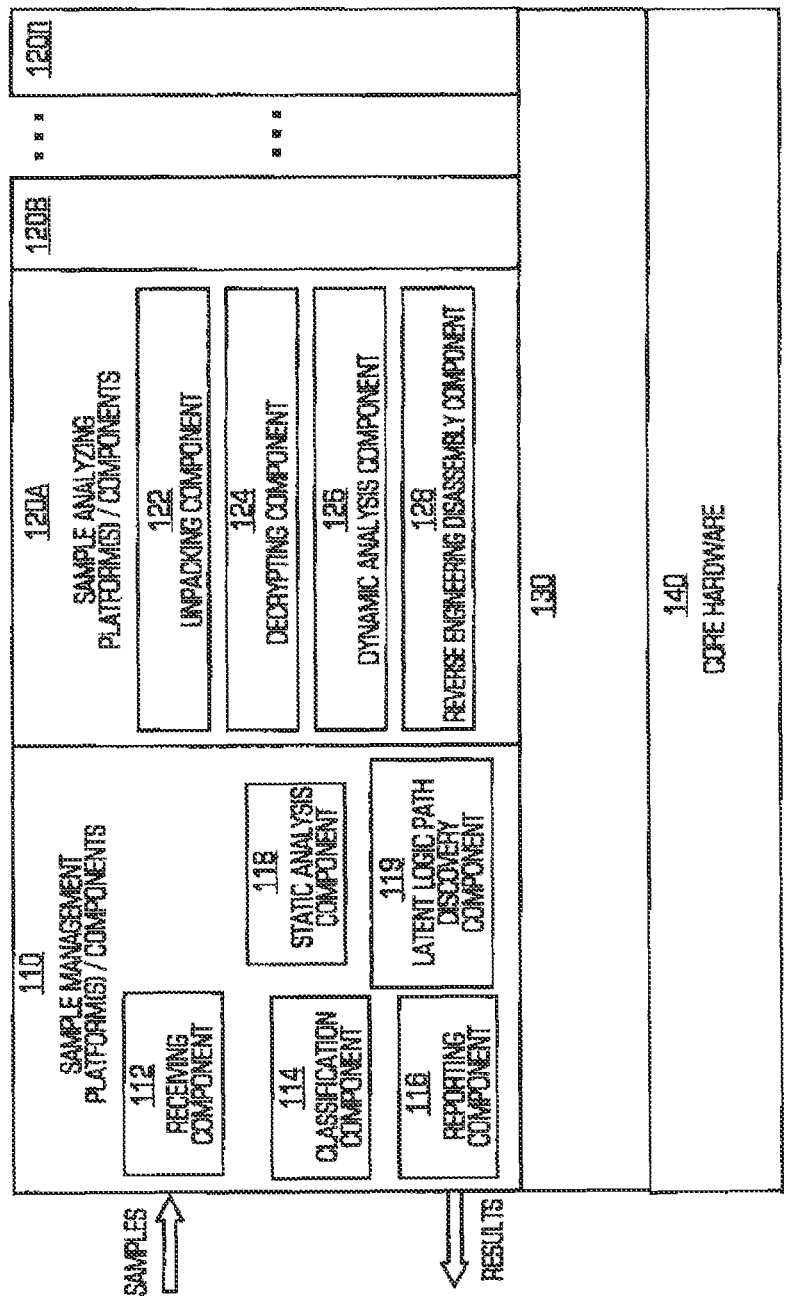
Figure 1B:
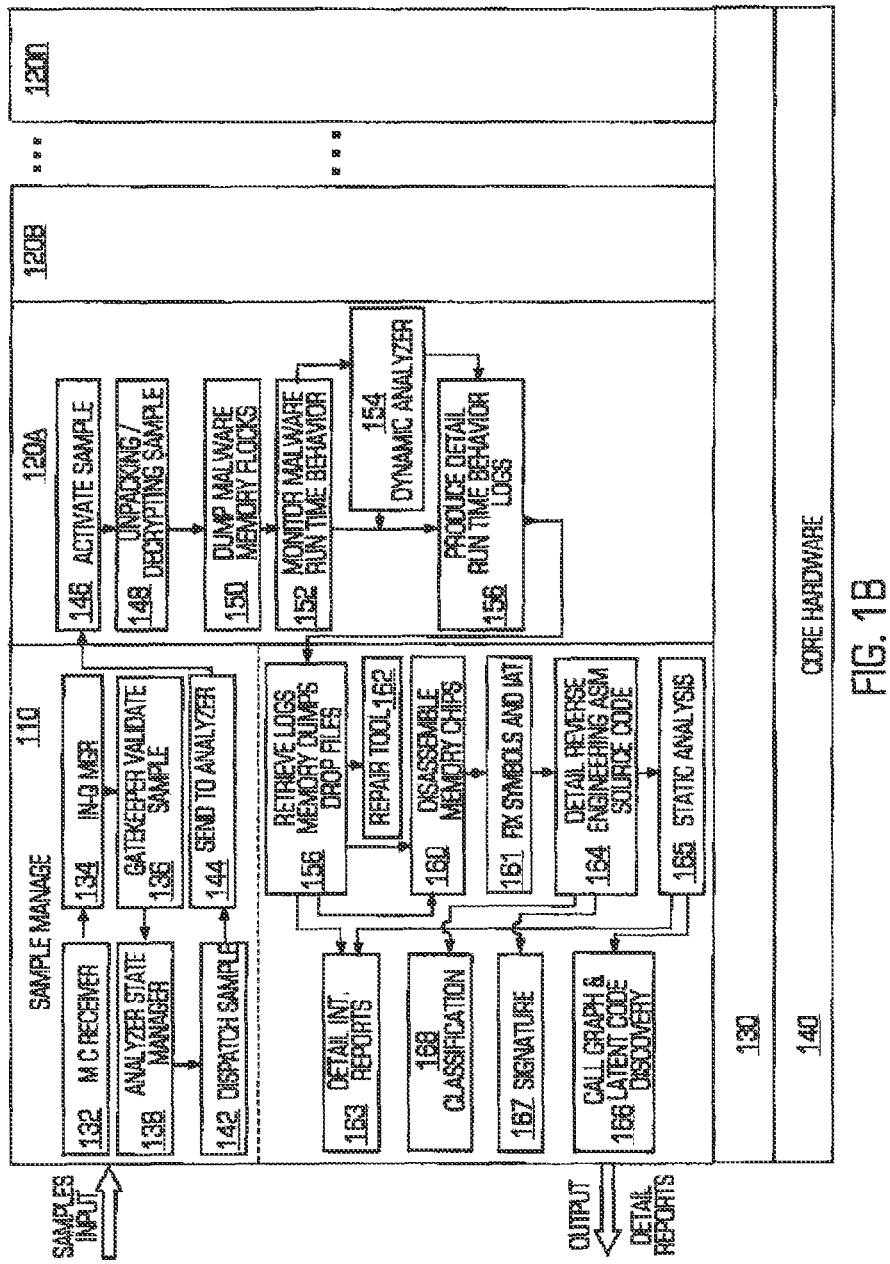

FIGS. 1A-1C illustrate exemplary block diagrams showing systems of various illustrative components of various innovative systems and features herein, according to certain implementations. Referring to FIG. 1A, an exemplary system architecture is disclosed, including a sample management component or platform 110, one or more sample analyzing components 120 (sometimes labeled 120A, 120B ... 120n in the drawings, and also referred to as "analyzer" herein), a layer 130, and hardware platform 140, such as a platform comprised of one or more multiple-CPU core system(s). In some exemplary implementations, the illustrative malware sample management platform/receiver 110 shown in FIGS. 1A-1B may be a 64bit harden secure Linux OS system (receiver). Such platform may manage malware samples and deliver them to a sample analyzing platform/components 120 (for example, XP analyzer) implemented on a different operating system (OS). Further, multiple analyzers may be configured to run simultaneously, with the sample management platform being configured to access and/or monitor each analyzer's 120 status and automatically sends sample to analyzer 120, one at a time. Once the analyzer 120 completes analysis, the sample management platform/components 110 will retrieve analysis results, perform secondly parsing and analysis, and forward such result to a desired location or recipient, such as a user configured destination.

In order to deal with large quantities/volumes of malware samples, parallel analyzers may be implemented and supported on a single platform, and each OS shall be absolutely isolated. Further, the channel between malware sample management platform 110 and the analyzers 120 may be managed by the platform, enabling high speed, secure and safe interaction and operation. Again, each analyzer and its OS may be totally isolated from each other. Once one analysis process is completed, analyzer's OS can be refreshed in seconds to ensure every malware analysis is conducted in a completely original clean OS native environment.

Exemplary systems may be configured to handle very large quantities of malware samples and perform forensic analysis at high speed. In one illustrative implementation, for example, such systems may be comprised of components including a malware samples receiver 112, a universal unpacking component 122, a universal decrypting component 124, a dynamic analyzer component 126, a reverse engineering component 128, a static analyzer component 118, latent execution logic path determining component, a classification component 114, an intelligent reporting component 116, and a latent logic path discovery component 119.

FIG. 1B illustrates another exemplary implementation of an exemplary malware handling environment is shown, showing various components and additional details of features and functionality. Referring to FIG. 1B, malware sample code (MC) is received at a malware code receiver 132, where it may be stored/processed via input queue managed by a queue manager 134. In some implementations, a gatekeeper component/routine 136 may then be utilized to perform validation functions on the sample code, e.g., to ensure it is a potential malware-infected file, is analyzable, that it's a sample that hasn't been analyzed before, etc. If such malware has been analyzed before, the gatekeeper component/routine may retrieve associated intelligent reports from a malware intelligent database. If the malware sample has not been analyzed before and it is analyzable, an analyzer state manager 138 may determine which one of analyzers is ready to analyze a new sample, while a dispatcher component 142 may then be utilized to send the sample, at 144, to the intended analyzer 120.

In the illustrative analysis process shown in FIG. 1B, the analyzer 120 receives the sample, activates the sample 146, and unpacks/decrypts the sample if it is packed/encrypted 148. In the illustrated process, the analyzer may then dumps out the malware runtime memory block 150, e.g. just after it unpacked or decrypted, as whole entire block or as portioned multiple memory blocks. During this exemplary malware execution process, part or all of the malware behavior may then be monitored and logged at 152. A dynamic analysis component 154 may then collect all the behavior logs, at 156.

Once the malware sample completes its run/execution life cycle, the memory blocks may be dumped and/or the behavior logs retrieved at 158. Here, in cases where the malware does not stop on its own, the analyzer may include a time out value defined and configurable to manage the malware run time and cease execution of the malware if the need arises. The raw data of these memory blocks may then be fed to a disassemble component, at 160, with the disassembled information also being combined with supplied with fixed symbols and IAT (Import Address Table) information, at 161. The raw data may also be utilized in producing the repair tool, as shown at 162. Those raw data also are used for producing intelligent reports at 163. Turning back to the malware processing after the symbol and IAT fixing, detail reverse engineering disassembly source code may then be derived at 164, which yields the malware information for static analysis 165, for classification 168, and for signature production 167. Further, call graph or other indication features, such as malware logic execution graphs may also be utilized, at 166, wherein such information may also be used to feed detail intelligent report at 163.

Based on the analysis results, systems and methods herein may further generate signatures and automatically produce repair tools for recovering systems that are infected by Malware. Innovative systems herein may be built on multiple CPUs and each CPU has multiple core system(s) with a hypervisor that hosts multiple operating systems (OSs). Each OS provides a native application environment for Malware to execute, which is required for dynamic analysis and to unpack/decrypt accurately. In certain implementations, the system may be installed as network 2-U or as 1-U inline or offline appliance, among others. These systems may be fully automated, highly scalable and high speed, providing inline Malware analysis and real time network security defending system.

FIG. 1C is a block diagram showing an illustrative sample analyzing platform or appliance, according to certain implementations. Referring to the exemplary implementation in FIG. 1C, the appliance may be configured with 2 network adaptors, a first adapter 172 that serves as a port for management functions and a second adapter 174 that serves as a port for data communication operations. As such, the first adapter/port 172 may be configured for managing appliance operations, and the second adapter/port 174 may be configured for receiving malware sample and sending analysis results. As shown, there are 6 sample analyzing components or analyzers 176A-176F running in parallel, although more may be implemented if hardware resource are sustainable. In operation, once each analyzer completes its analysis task, the analysis results may be retrieved by a sample management component (not shown) and stored in results storage hard disk 195 for second phase analysis processes 196. Here, such management component may be configured to run on a totally separate OS that is different from malware targeted OS, for example in one instance, a 64-bit Linux hardened secure and safe OS. Further, retreival of the results may then be achieved through NTFS raw format reading access. Such implementation is fast and safe, and also independent from the running OS (e.g., to prevent the malware sample from causing the analyzer operating system to crash).

Once all the results are retrieved, the analyzer OS is refreshed via a clean memory snapshot 178 (or "golden image"). The various RAM disks 180A-180F that are associated with each analyzer may also get refreshed via such clean memory RAM disk at 182. Once each finished analyzer memory and its RAM disk get refreshed, they are again clean and ready for analyzing another sample. A status manager 188 may also be included to maintain and update status of the analyzers, while a sample dispatch component 190 may be utilized to transmit the various new samples to an intended analyzer for analysis. A batch of network adapters 184A-184F may also be included to provide local network service emulators that answer the malware sample requests, such as NDS service, HTTP service, SMTP service, POP service, IMAP service, FTP service, as well as network mapping driver for malware to infect, etc. In addition to one or more banks of the core CPU elements 192, 193, various hard disks may also be utilized, such as one for storing malware samples 194 and one for storing analysis results 195. Further, input and output interfaces 198 may also be included to provide for communications, such as for enabling remote access, for sending malware samples, and for sending out analysis results.

FIG. 2 is a diagram illustrating various exemplary aspects of the hypervisor layer as well as components and/or features thereof, according to certain implementations. Referring to FIG. 2, a sample management platform/component 210, several sample analyzing platforms/components 212, 214, 216, an interface 218, a platform 220, and a core processing area 250 are shown. Here, the core processing area 250 may comprise the physical hardware of the system, including multiple multi-core processors, for example. As indicated above, implementation of a hypervisor layer ensures that multiple operations systems, such as Windows OSs (or other OSs that the subject malware is intended to infect), are isolated from each other and that each OS has its native application environment without emulation. To provide the full understanding of malware behavior, as set forth further below, systems and methods herein provide each potential malware code being analyzed a native OS environment in which any malware is executed to demonstrate its true behavior. For example, in implementations where the innovations herein observe and analyze Windows-based Malware, a native Windows OS shall be provided to Malware, i.e., not a Windows emulation. Further, such OS is configured to refresh itself in a very short timeframe, to enable analysis of large volumes of malware samples.

As shown by way of illustration and not limitation in FIG. 2, exemplary layer 220 (also referred to as "hypervisor") provides for a secure and safe platform that may host multiple analyzers running in parallel. Further, as a function of the hypervisor layer and isolation it provides, systems and methods herein may be implemented as appliances and configured for in-line or for off-line malware analysis, capable of receiving and processing large quantities of malware samples. A sample management component 210, as illustrated in FIG. 2, may be configured to provide one or both of malware sample queue functionality and results analysis and/or management features. Here, for example, an illustrative sample management component 210 may be built with security hardened 64 bit Linux OS, i.e., for analysis of Windows target malware samples. In addition to receiving the sample, the sample management component 210, may also be configured for preparing results to transmit externally, e.g., for sending via various network or communication channels to external elements. FIG. 2 also depicts several sample analyzing components 212, 214, 216, which illustrate multiple analyzers running in parallel on the secure and safe platform. As discussed above, these sample analyzing components may be configured to run on operating systems that constitute the native environments to the relevant malware, in question, e.g., native Windows system for analysis of Windows target malwares, or other OSs when malware samples target such other OSs.

Figure 3A:
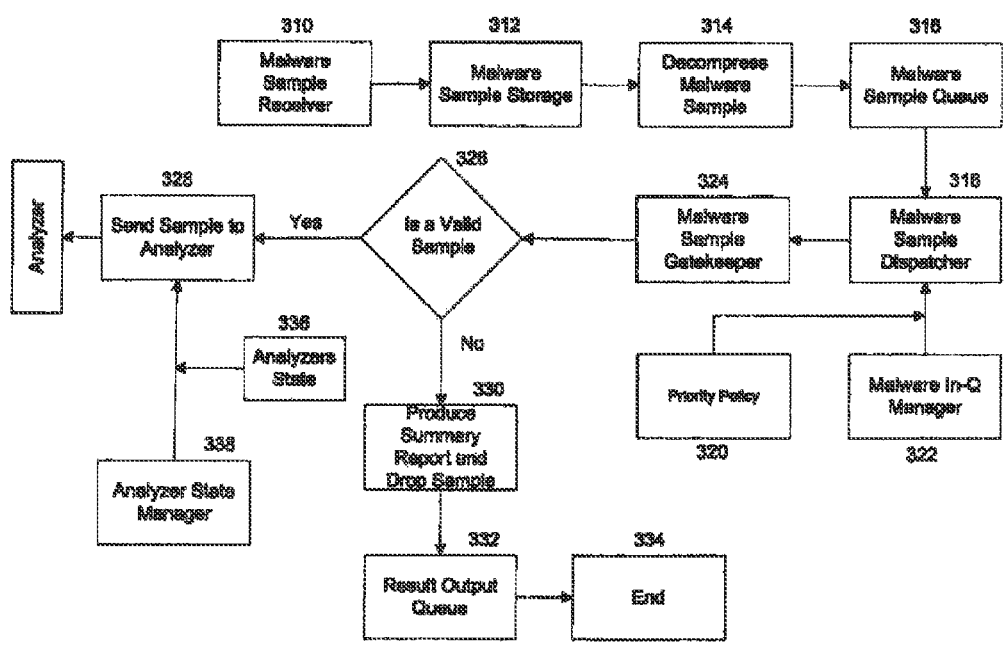
FIGS. 3A-3B are diagrams illustrating various exemplary aspects of receiver and in-queue management components and/or features as well as a high speed channel for sample-related transmissions, according to certain implementations.
Figure 3B:
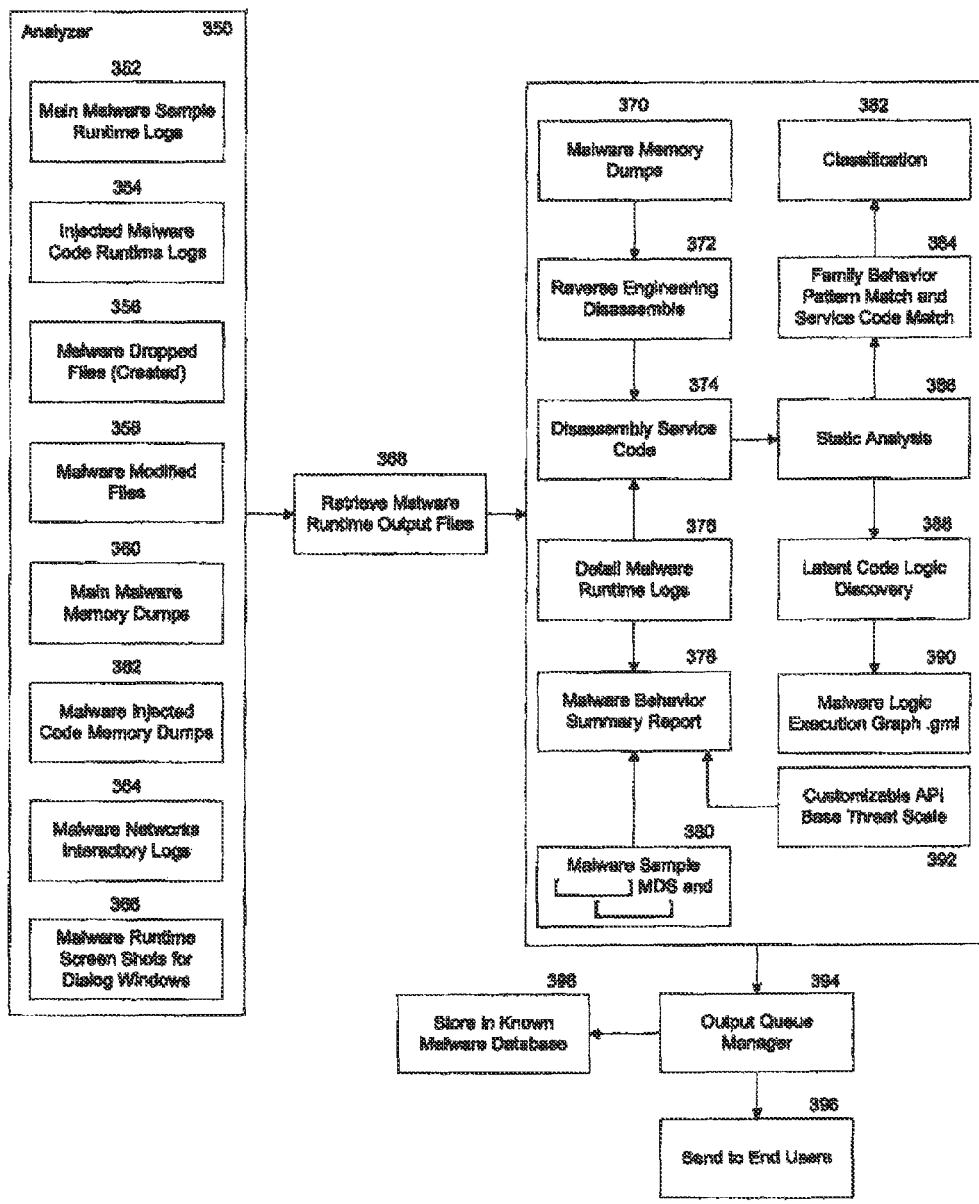

FIGS. 3A-3B are diagrams illustrating various exemplary aspects of receiver and in-queue management components and/or features as well as a high speed channel for sample-related transmissions, according to certain implementations. Referring to FIG. 3A, exemplary in-queue management and high speed operation features are illustrated, showing implementations using one or more high-speed channels for delivery samples to analyzer and receive result from analyzer.

As shown in the illustrative process of FIG. 3A, once malware samples are received at 310, they may be delivered to a malware sample storage location 312. If malware samples are compressed, as they usually are, they are uncompressed at 314 before being processed via malware sample queue, at 316. A malware dispatcher may then, at 318, fetch each malware sample, one at a time, and send them to a gatekeeper subcomponent at 324, e.g., for validation or qualification. If such malware has been analyzed before, its analysis reports may, in some implementations, be retrieved from existing malware intelligent database. Otherwise, the gatekeeper subcomponent may perform one or more gatekeeping functions, such as verifying whether or not the malware sample is a valid executable file, whether or not it has all run-time-required DLLs to support it to run, whether it is digitally signed, and/or whether or not it is a legitimate file (e.g., from a whitelist, etc.), among others. If the malware sample fails such verification routine(s), at 326, the malware sample will be dropped and a report will be generated at 330. Further, such report(s) may be pushed onto output queue at 332, and the sample life cycle may be ended at 334. However, if the malware sample triggers greater concern via such verification routine(s), the sample will then be sent to analyzer 328 for analysis. Here, at 338, the analyzer state manager may check all analyzers states at 336 and decide which of the analyzers is ready to accept the sample for analysis.

Turning to FIG. 3B, an exemplary analyzer 350 and an exemplary sample management platform/component 110 are shown depicting details of an exemplary flow of the sample through dynamic and static analysis processes. At 352, once the malware comes into the analyzer 350, it may be activated and its run-time behavior logged. If the malware infects other running process by injecting malware code into other running process space, those malware activities from the code injected into other processes may also be logged, at 354. If malware creates files, those files may be collected at 356. Further, if malware modifies other existing files, those modified files may also be collected. As also shown in FIG. 3B, the main malware process memory block may be dumped at 360, and if the malware injects code into other running processes, such code in memory may also be dumped and collected at 362. If malware tries to infect or spread through network services, such activities or behavior may also be logged and collected at 364. If malware at run time produces one or more dialog boxes and/or any other kinds of windows, screen captures thereof may be produced and collected as image files at 366. All such logs, memory dumps, dropped files, infected files, etc. are direct-result dynamic analysis materials. Such information is raw data and may be retrieved at 368 via a retrieval component/mechanism. This retrieval component/mechanism may be implemented via native NTFS access without interfering the operating system used for analysis, e.g., without interfering with a running Windows OS on a Windows-based analyzer platform. Some malware, during run time or when its execution completes, may crash the system or reboot the system. However, since runtime data may be retrieved, at 368, without relying on the running analyzer OS, all the produced raw data may be retrieved for further analysis consistent with aspects of the innovations herein.

Once all the malware run time data are retrieved, a second phase of analysis may be performed via the sample management platform, such as on a Linux platform. Here, for example, all memory dump files 370 may be fed to reverse engineering disassemble component, at 372, which may produce disassembly source code at 374. Repair/resolution of this disassembly source code, such as fixing its symbols and API names, may then be accomplished with information provided from malware run time detail logs, at 376. This disassembly source code, e.g. once it has symbols fixed and API names resolved, may then be utilized via the static analysis processes, as shown at 386. As part of static analysis, systems and methods herein may match behavior patterns and/or calculate source code similarities, at 384, to produce malware family classification at 382. Such matching features may be utilized to identify the given malware sample, such as by identifying any family or families to which the sample belongs. Additionally, in some implementations, a new malware family or new classification information may be established when no match is found. Further, also via the static analysis process, any latent code logic path(s) may be examined and discovered 388. Here, such latent code may represent malware hidden logic paths, e.g. often representing a logic bomb or hidden payload, which under certain condition(s) may be trigged to execute. Some implementations may also produce one or more full malware execution logic graphs or other electronic representations, at 390 (e.g., via a .gml file, etc.) as a malware intelligent report or component thereof. Here, for example, such electronic and/or graphical representation may show the entire malware logic execution, using two different indicia (e.g., different markers, colors, etc.) to distinguish the latent code path from executed logic path.

As part of further functionality present in certain implementations, the detail malware run time logs may be utilized in malware intelligent behavior summary reports, while such reports may also include malware sample checksum (such as MD5) and hash value information 380. After the dynamic and static analysis processes are complete, the reports may be produced and forwarded to output queue at 394, to be handled by an output queue manager. Those reports may then be sent to the end user at 396 and also stored, e.g., within a malware intelligent storage location such as a known malware analysis database 398.

Figure 4A:
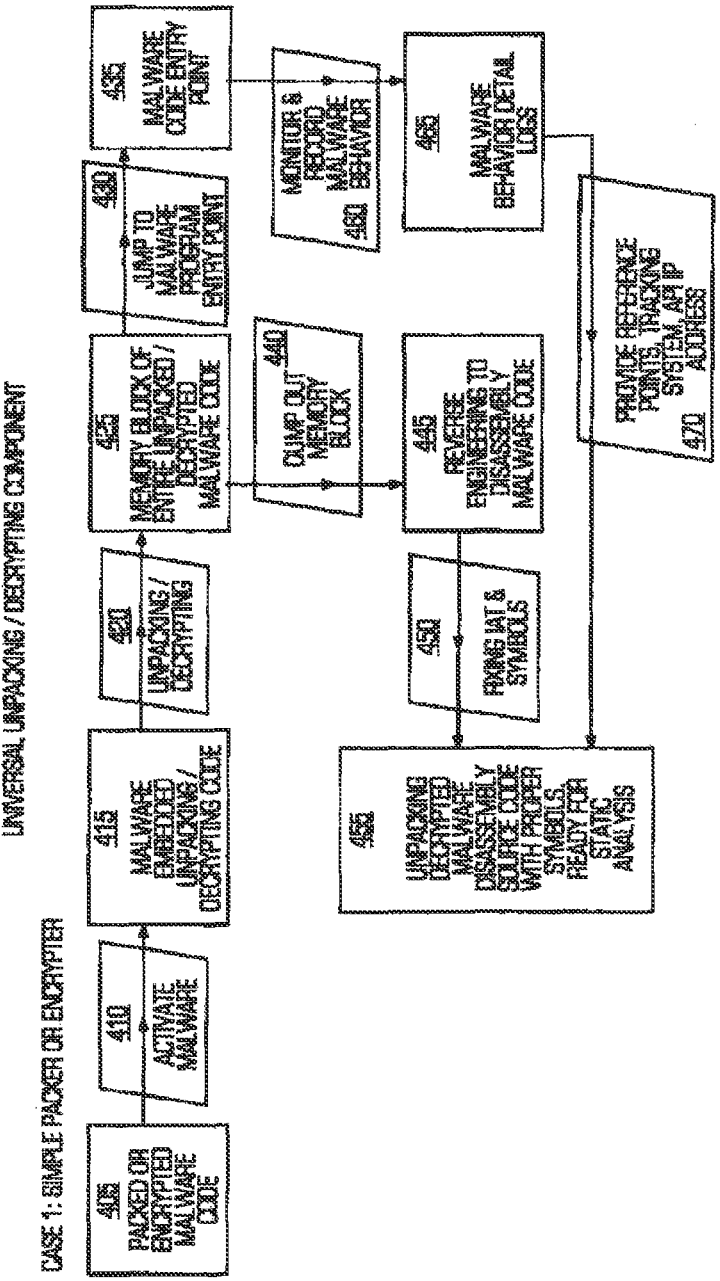
FIGS. 4A-4B are diagrams illustrating various exemplary aspects of malware unpacking and/or decrypting component features, according to certain implementations.
Figure 4B:
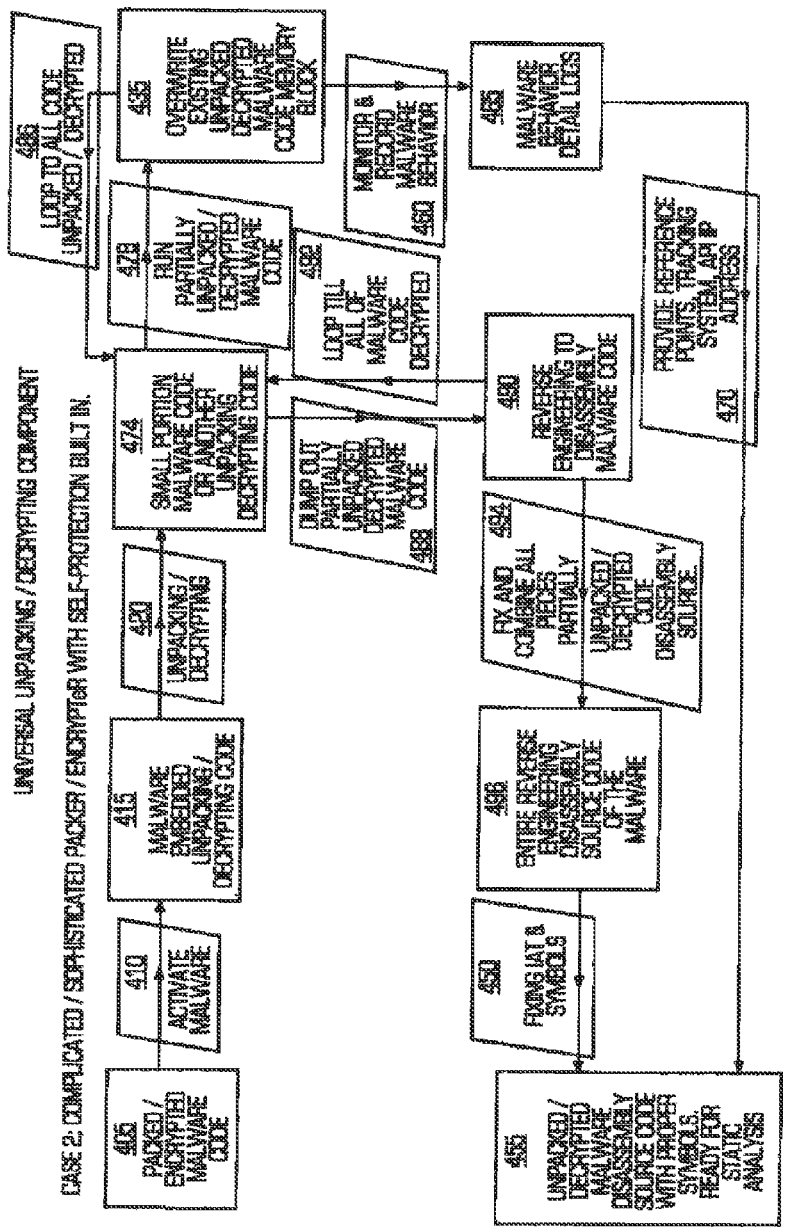

FIGS. 4A-4B are diagrams illustrating various exemplary aspects of unpacking and/or decrypting the malware code, according to certain implementations. Since most Malware contains some forms of compression (packing) and/or encryption, various innovative systems and methods herein utilize one or more universal unpacking and decrypting components configured to recover malware original disassembly code. The static analysis (latent code logic path) and dynamic analysis components then work together processing such malware original disassembly code to provide important discovery of the malware in the high-speed, high-volume implementations set forth herein. Here, for example, in achieving such reverse engineering of malware binary code, the malware may be unpacked and/or decrypted as follows. Further, consistent with the present innovations, the process of unpacking and/or decryption may be fully automated in order to help provide automation of the entire system. While the unpacking component 122 and the decrypting component 124 are illustrated in FIG. 1A as being separate components, as the unpacking process may certainly be disparate, such components may be integrated or distributed via various components, modules and/or routines.

FIG. 4A depicts a state/flow diagram illustrating exemplary basic processing of an unpacking/decrypting component, consistent with one embodiment. Exemplary unpacking/decrypting processing, here, begins with packed and/or encrypted malware code, at 405. The malware code is then activated 410 in isolation single CPU core from other cores via an operating system/platform having its own native application environment, as explained elsewhere herein. Such activation executes the embedded malware unpacking/decrypting code, at 415, which has often been created/engineered with various encryption(s) and/or packed into a variety of states and/or levels. The embedded code is then run through one or more unpacking and/or decrypting processes 420. Herein, FIG. 4A describes handling of malware code of a basic variety, e.g. malware that does not possess several levels of packing, such that memory block(s) of the entire unpacked/decrypted malware code are produced 425 after the unpacking/decrypting processes 420.

With the entire unpacked/decrypted malware code available 425, the universal unpacking/decrypting component may begin execution of a first branch of processing by preparing to execute the malware program 430. (A second branch of disassembling the malware is described below.) In this first branch, from the malware code entry point 435, the universal unpacking/decrypting component executes the malware program while performing processes of monitoring and recording the malware behavior 460. Via these execution and monitoring processes, the malware activity is determined and recorded, providing information from which various malware behavior detail logs may be generated 465. From the information revealed and/or the logs generated, the universal unpacking/decrypting component may then provide relevant data of the malware, at 470, including reference points, tracking system API IP (Instruction Pointer) memory address information, etc. This information may be used, inter alia, in connection with information from the second branch to provide unpacked/decrypted malware disassembly source code ready for static analysis 455.

The second branch of disassembling the malware also begins from the state information comprised of the memory blocks of the entire unpacked/decrypted malware code, at 425. From this state 425, the memory block(s) are then also dumped out 440, to begin the second branch, for the further disassembly analysis being performed in parallel via this branch. Next, the universal unpacking/decryption component performs reverse engineering on the memory block(s) to disassemble the malware code 445. From the reverse engineering and disassembly, the universal unpacking/decryption component is then able to provide desired information regarding the malware, at 450, including, e.g., fixing IAT tables, symbols, resolving API names, etc. This desired information is then combined with other information, at 455, to provide unpacked/decrypted malware disassembly source code with proper symbols, ready for static analysis.

FIG. 4B depicts a state/flow diagram illustrating exemplary, more advanced processing of an unpacking/decrypting component, consistent with further embodiments. The initial processing of FIG. 4B is similar to that of FIG. 4A in that packed and/or encrypted malware code 405 is activated 410 in isolation CPU core system from the cores, to execute the embedded malware unpacking/decrypting code, at 415. Also, the embedded code is then similarly run through one or more unpacking and/or decrypting processes 420. Here, however, FIG. 4B goes on to describe handling of malware code of more sophisticated varieties, such as malware that possess several levels of packing or other encryption that requires more substantial processing to obtain entirely reverse engineered and disassembled source code of the malware.

The more sophisticated process of FIG. 4B starts from the unpacking/decrypting process 420, and the embedded unpacking/decrypting component or process may only allocate a small block of memory 474 and unpack/decrypt a small or first layer of packed/encrypt code via a partial code unpacking/decrypting routine, at 478. This partially unpacked/decrypted code in memory block may then be dumped out, at 488. In another prong of operation, the malware may then be released into this unpacked/decrypted memory block to execute. Upon performing this incremental run routine, the process may loop back, at 486, to the apportioning step 474, where another small memory block may be allocated for another layer of unpacking/decrypting. Alternately, the process may simply overwrite, gradually the already unpacked/decrypted code, at 482. This overwrite operation may including one or more timing features to make the memory dump process possible, such as including configuration to dump the memory at the one moment at a time when it's possible to have a entire view of the memory block before it is overwritten.

This subroutine, including allocation of small memory block(s) or reusing the small block from memory, then unpacking/decrypting, and then looping back 492, will continue until the entire malware code is unpacked/decrypted and executed. As such, while malware is unpacking/decrypting itself, i.e. each small piece at a time, a monitoring and recording component may be constantly activated to produce detail run time logs at 465. Once all the memory blocks are collected, at 488, reverse engineering and disassembly component starts produce disassembly source code at 490. Such disassembly source code may then be linked together, at 494, e.g., to form up the complete malware program reverse engineering disassembly source code at 496. Next, at 450, this entire reverse engineering disassembly source code may undergo further completion/remap/rebuild including fixing it with proper symbols, resolving API names according to its run time logs and various parameters, etc. Additionally, here at 450, pieces of code segments from different small memory blocks may be sorted and arranged accordingly, to yield the completed readable final master piece of disassembly source code at 455. Such master piece of disassembly source code having proper symbols, names of APIs, parameters, and other readable information may be accomplished, at 465, via the cross reference checking from the detail malware code execution run time, with the various information such as reference points, tracking system API IP addresses, etc. prepared/provided, at 470, for use to achieve the final master piece of disassemble code, at 455. This master piece reverse engineering disassembly source code, produced at 455, is then ready to pass, e.g., to static analysis component.

Figure 5:
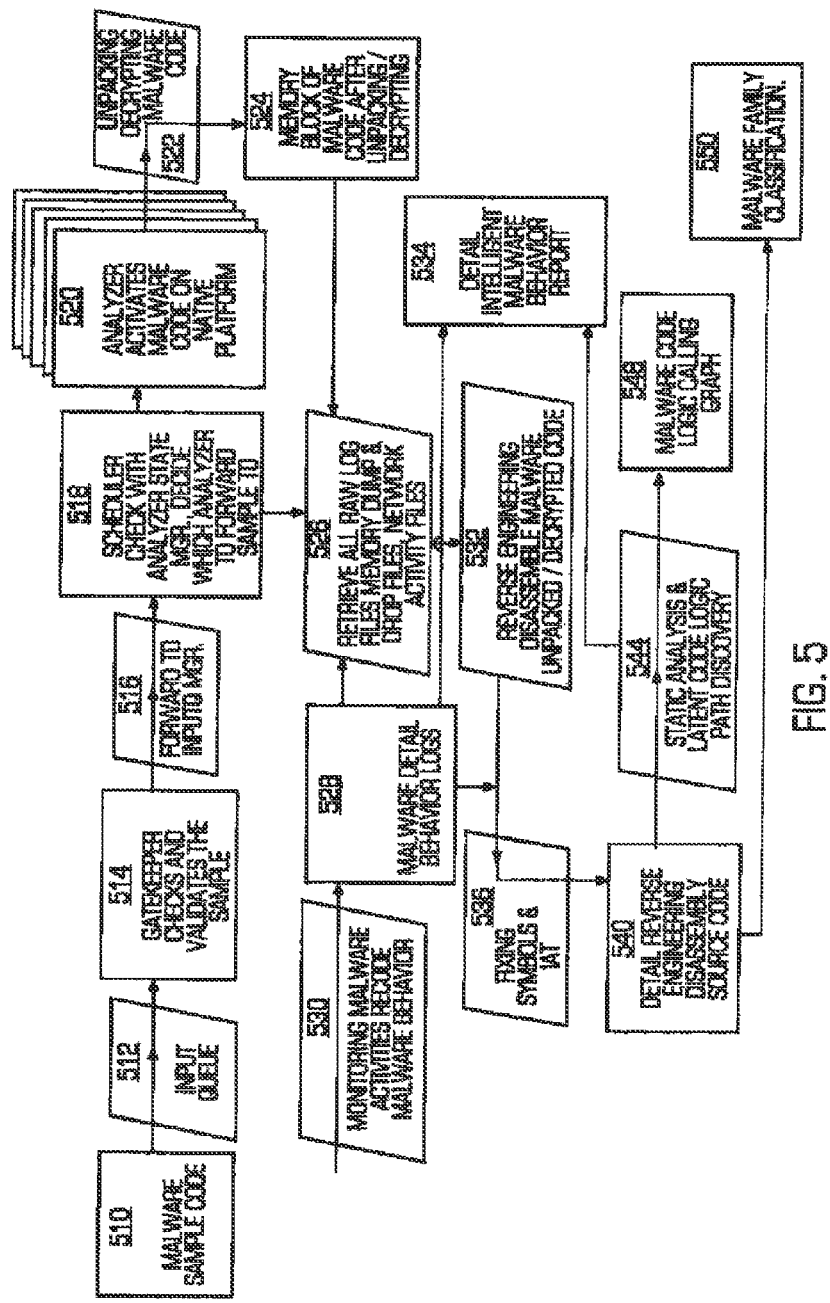
FIG. 5 is a diagram showing various illustrative aspects of exemplary dynamic deep analysis components and/or features, according to certain implementations.

FIG. 5 is a diagram showing various illustrative aspects of exemplary dynamic analysis components and/or features, according to certain implementations. Referring to FIG. 5, a piece of malware sample code is sent to a malware analyzing platform, appliance, etc., at 510, it is received in the repository input queue at 512. Further, at 514, a gatekeeper routine may check the sample from input queue and validate each sample. This validation may include validating PE header information, determining the DLLs required to support running the malware, whether or not such sample has been analyzed before, etc. Once the sample passes the gatekeeper routine, it is forwarded to an input queue management component or routine, at 516. The queue manager may then decide, e.g. according to priority in each queue, which sample to be sent first. At 518, a scheduler routine may dispatch the malware sample from the queue manager, and also verify state of the analyzers' state managers to find out which analyzer is available to analyze the next sample. Here, as also set forth elsewhere herein, the platform may have multiple analyzers running parallel. Once one of the analyzers becomes available, the scheduler routine may send the sample to the analyzer, at 520, to conduct analysis. As one of the first steps in such analysis process, at 522, the analysis engine may check to determine whether or not a given sample is packed or encrypted. If so, and if the detected packing/encryption is found to be of a known packer, the analysis engine will unpack or decrypt the malware sample. If not, the analysis engine may invoke the malware sample to run on a relevant OS/platform, such as a Windows OS for malware aimed at a Windows environment (however, the relevant OS/platform could be a different platform depending on the OS to which the malware is targeted). Here, for example, malware samples typically embed information enabling determination of the needed unpacking/decrypting engine inside its code. Here, then, one or more memory blocks of malware may be obtain after unpacking/decrypting 524.

Turning back to FIG. 5, a malware run time monitoring component or routine may monitor, at 530, the malware sample run time, produce memory dump after malware unpacks/decrypts itself at 524. Besides performing malware memory dump operations, such monitor may also produce detail malware run time behavior logs, at 528. Further, depending what type of packer or encryption is involved, sometimes malware may implement multiple layers of packing/encrypting to protect its code. In this case, more pieces of memory dump and scatted log files need to be retrieved at 526. Once all the detail run time logs and memory dumps are available, the disassembly engine may reverse engineer, at 532, the binary code after unpacking/decrypting into disassembly source code. At 534, the detail malware run time logs are converted into detail intelligent report with all actionable items. At 536, the reverse engineering disassembly source code is further processed, e.g. as a function of additional information from detail run time logs, to get APIs calling references resolved into API names with proper parameters. Report information may, accordingly, be provided in a more readable format, detailing the completed disassembly source code for the malware, at 540. This detail and completed malware disassembly source code may then be provided to static analysis engine at 544, wherein it compares all malware code logic execution path with the paths already executed showing in run time logs, such that the malware latent code (malware code logic that hasn't been executed) may be uncovered. Further, when graphical means are utilized, different indicia such as colors may be used to highlight the logic path executed and ones not executed yet in the calling graph at 548. Also, at 550, the input of completed detail disassembly source code may then be used to classify the malware family.

FIG. 6 is a diagram showing various illustrative aspects of malware reverse engineering and/or disassembly components and/or features, according to certain implementations. Here, for example, Malware binary code may be reverse engineered to at least the disassembly level, e.g., to reveal latent logic bombs or other executables that are inaccessible, unavailable or otherwise unable to be explored during dynamic analysis. Once the disassembly source code is obtained, static analysis features may be employed to reveal all of the Malware's logic paths and compare such results with dynamic analysis result, to obtain information regarding hidden logic executables or bombs, such as those that are only trigged at future times, events, etc.

Referring to the reverse engineering/disassembly features shown in FIG. 6, at 610, the malware code from memory (as a whole, or in pieces) may be dumped into at least one file or files for analysis. In one basic instance, at 612, a straightforward disassembly routine may unpack the malware binary code in memory, and dump the entire memory just before malware jumps to the program's entry point. Further, with regard to instances of complicated malware, more sophisticated malware unpacking/decrypting routines may be used to unpack/decrypt the malware code in one or more small portions and execute it or them, and then unpack/decrypt another small piece to overwrite the first memory block, and so on. During such more sophisticated routines, at 614, only small piece(s) of memory may be dumped to obtain small portion(s) of malware binary code. Such routines may also obtain the malware injected binary code if such malware injects infection code into other running processes. Additionally, at 616, the more sophisticated routine may check to see if there is another malware infection occurring or if other unpacking/decrypting procedures are occurring, whereupon it may loop back to dump another piece of memory, at 610. This loops may continue until all malware binary code is dumped out and disassembled.

Next, at 618, various translation and/or resolution routines may be performed as a function of the memory dump(s). Here, for example, the binary code may be translated into disassembly language programming source code. Further, the symbols and API names may be resolved so that the source code becomes human readable. These processes may also utilize, as shown at 620, various detail malware run time log files, which may provide good reference(s) to each call. Such information may be used at 618 for fixing symbols and calling API names, and may also used be to fix IAT and other PE head information. Lastly, a final completed disassembly programming source code may be obtained at 622, representing the entire malware code after unpacking/decrypting. Accordingly, consistent with the features and innovations herein, malware having complicated packing and/or encryption (with even VM or other protection) can be unpacked/decrypted. As such, the underlying disassembly language programming source code, with fixed symbols and API names, may then be used for further static analysis and latent code discovery, as set forth elsewhere herein.

FIG. 7 is a diagram showing various illustrative aspects of an exemplary static analysis components and/or features, according to certain implementations. In some embodiments, such static analysis components and/or features are utilized to discover and provide information regarding Malware latent execution logic paths. Here, for example, some malware is designed with latent executable logics that are hidden and may also be configured to wait for a particular situation or remote control command to execute. These hidden execution logic paths or hidden payloads cannot be revealed via a singular execution and monitoring step. One way to uncover those hidden logic behavior is to run the malware sample code at different environments, such as different application versions and its environment settings, different system time, different versions of OSs in hope such hidden logic path depending condition is met and its behavior can be monitored, but it is hard to uncover all possible hidden logic before evening knowing such hidden logic exists in malware program. However, consistent with the present innovations, static analysis features herein based on completed and fully unpacked/decrypted disassembly language malware source code may be utilized to uncover malware hidden logic path and discover malware latent code. Further, implementations herein may combine dynamic analysis features that reveal malware current payloads and static analysis features that can obtain malware potential payloads, to obtain innovative systems and methods for obtaining entire malware behavior.

Referring to FIG. 7, at 710, an illustrative static analysis process may begin with fully unpacked/decrypted completed malware disassembly language source code. Such fully reverse engineered information may include infected malware binary code that has been injected into other running processes. The process may also begin with, as another input into static analysis, detail malware run time logs 720, including logs from the infected code that has been injected into other running processes. All this information may be utilized, at 722, wherein a static analysis engine or process sorts out all calling functions and sub functions, system API names and symbols. Next, at 724, static analysis may proceed to building malware execution logic path graphs or other logic representations, wherein currently executed path or path(s) are delineated and represented, and logic code path(s) that haven't yet been executed (e.g., potential payloads, hidden logic, etc.) are also delineated and represented. The process may then proceed to providing listings of all malware logic paths 726, including those executed and not executed, and then producing logic execution graphs (e.g., .gml files, etc.), highlighting the various branching conditions, nodes, etc.

At 730, further analysis of those logic paths that have not yet been executed during dynamic analysis is performed, to discover what kinds of behavior occurs when these logic routines are executed. As a result of this analysis, detail logs are produced 732, which may be similar to the behavior logs produced in the dynamic analysis process. Finally, full behavior reports may be generated 736 based on various input. In the illustrative implementation shown, behavior inputs from the static analysis process at 732 may be combined together with behavior inputs from dynamic analysis behavior reports 734, to form the full behavior reports. As such, final malware behavior reports at 736 cover the entire malware logic paths, including the currently executed path and the non-executed logic paths. Here, for example, these reports may include information such as which files the malware changes or may attempt to change, any system registries it seeks to add or modify, what network ports it may open or attempt to utilize, devices or locations to which it may seek to connect, and what system processes or objects it may compromise, among others.

Further, such full coverage reports may list all malware behaviors with actionable items, as well as, in some implementations, warning levels to reflect the sensitivity of the malware. Systems and methods herein may also be configured to provide these actionable items for utilization by policy-based security systems to enhance the system security. Here, for example, the innovations herein may be configured to provide specific information regarding actions that such malware may take and/or components or behaviors that the malware may study, to assist in defining, creating and/or enabling new policies. Features related to providing such full coverage reports may also be integrated into existing security warning systems.

FIG. 8 is a diagram showing various illustrative aspects of exemplary malware classification components and/or features, according to certain implementations. Malware classification components or features consistent with the innovations herein may perform processes such as classifying malware as a particular type of malware and/or grouping malware variants that belong to subject families as a function of the classification analysis. One exemplary aspect of malware classification herein is classifying malware as a particular type of malware, such as a virus, worm, Trojan, spy ware, key logger, etc.

Another classification aspect herein relates to grouping all variants that belong to the same family, e.g., as a function of the malware behavior. Here, for example, new malware variants that use different packer or encryption mechanisms on the same malware binary code often confuse existing systems, such as those implementing commonly used signature based scanning regimes. Moreover, there are also situations where malware writers make slight changes to small portion(s) of malware code and release it again, such that it becomes a new variant of the same malware family. As such, the classification components and/or features herein may be configured to group all variants that belong to the same family as a function of one or both malware behavior and/or a malware's full coverage disassembly source code.

Overall, tacit results from meaningful classification functionality not only foster communication among researchers and the publishing media, but also help in policy based security systems. Here, for example, since systems and methods herein are configured to provide more accurate data regarding relevant malware family information for the subject code as well as improved information regarding new variants of such families, this enables existing policy based systems to more quickly determine if sufficient policies are in place to handle the subject malware, or if new policies are required to handle any new variant or family uncovered. Further, via utilizing analysis features for same family malware that typically shares a common code base and exhibits similar behavior, the innovations herein provide effective repair tools that enable such malware to be defeated in the same way.

Referring to the exemplary classification process of FIG. 8, the input to the classification component may be the full coverage reverse engineering disassembly source code 810, which may also include infected source code injected by the malware into other running processes. At 812, a parsing routine may be utilized to analyze all of the disassembly source code, filter out at least some of the obfuscation code planted by the malware writer, and determine execution logic path flow(s). Next, a scoring routine 814 may be performed to assign measures, such as weights and/or scores, on the source code as against knowledge of existing malware families. Here, for example, the scoring routine may assign different similarity score to the existing malware family common base disassembly code via analysis (as a function) of the op codes and/or operands. Then, a comparison routine 816 may be performed to summarize or codify a final similarity score of the malware code in question to various existing malware families. A classify sample routine 818 may also be performed to classify the given sample as a relevant type of malware, such as worms, Trojans, virus, spy ware, key logger, etc. Further, in some implementations, this classify sample routine may be performed in parallel with the comparison routine 816, and it may also perform its classification functionality as a function of the source code interpretation.

An output of the comparison routine 816 may then be provided as an input to a mapping or matching routine 822. In some implementations, malware behavior reports from the dynamic analysis process(es) 820 may also be provided as an input to the comparison routine 816. Information from a database of existing malware family common based disassembly source code abstractions 826 may also be provided to, and may even be used to compare with given malware sample disassembly source code via, the matching routine 822. Moreover, information from a database of existing malware common behavior patterns or metadata 828, may also be input to the matching routine 822, to be used in the various matching and/or comparison determinations made therein. As such, based on the overall analysis of the various inputs including the malware behavior and disassembly source code matching, the matching routine makes one or more final determinations, provided at 824, that classify or associate the given malware sample(s) with the family or families to which it is most closely belongs.

FIG. 9 is a diagram showing various illustrative aspects of exemplary malware signature generation components and/or features, according to certain implementations. In accordance with this illustrative process, for example, once suspicious malware binary code is analyzed, its signature may be abstracted by the signature process shown in FIG. 9, e.g., for signature based scanner. Such signature process begins by reading in a malware sample file, at 910. Next, the signature process may analyze and parse PE head information block, at 912. At 916, further analysis is performed to sample the control data segment as well as portions of the key op code binary information. Then, the signature process may convert control data segment(s) and/or key op code stream(s) into fast, searchable integers and/or hash values. At 920, translate the produced integer(s) and/or hash value(s) may be translated into one or more signature index value(s). Next, one or more signature databases may be queried 922 to see if such malware already has a signature in such databases. If not, the signature process may insert, at 924, the new malware index into any salient signature database(s), e.g., with proper name and information.

FIG. 10 is a diagram showing various illustrative aspects of exemplary malware disinfector and repair components and/or features, which may disinfect and/or repair systems that have been infected by malware, according to certain implementations. The exemplary repair process of FIG. 10 shows two illustrative inputs, 1000 and 1010, to an initial disinfection action routine 1012. A first input 1000, such as detail behavior logs from the dynamic analysis, may also include logs from the infected malware code injected to run in other processes. The second input 1010 may include the detail malware behavior logs from the static analysis results, and may include those logs that characterize hidden logic path information, i.e., code representing malware potential payloads. As a function of the inputs, the repair process may, for each viral behavior under analysis, produce a corresponding actionable instruction 1012 to disinfect (reverse) the viral action. Next, at 1014, the repair process may translate those run time handlers or IDs into proper searchable names, such as file names, process names, registry names, etc. Such file names may also be used in searching and fixing during repair stage. At a create signature routine, the repair process may produce a signature for each malware dropped file, in order to search and remove them during repairing process. Then, at 1018, the repair process may produce a repair executable that embeds those repairing actionable items and configurations, e.g., based on the malware viral behavior logs.

The repair process may then prepare an OS boot image that the malware doesn't run on 1020, for example, Windows malware only runs on Windows OS and not on Linux OS, so using a Linux OS boot image is an appropriate choice for Windows malware. Next, at 1022, a prepared executable is executed on the repair-configured OS boot image, such that the executable directly accesses the infected file system (e.g. Windows NTFS) without activate the infected OS (e.g. Windows OS). Then, the repair process prepares an automatic batch process or program 1024 that runs automatically after boot into repairing OS image (e.g. Linux), with such program being configured to call the repair tool to disinfect the target contaminated system. Following this, the repair tool may build a database that contains repair tools for each analyzed malware sample 1026, wherein malware signature indexing may be used in the database. During the repair processing, here, if malware is found via a signature scanner, the repair tool may use such signature to retrieve corresponding repair tool from the database to fix the infection. Additionally, a transmission process 1028 may be utilized to push the relevant repair tool to a remote end point system when such end point is infected by malware. Here, for example, if a desktop computer is identified as infected by a malware, a repair tool can be pushed to the desktop computer system to start the repairing process. Further, at 1030, a program may be built to log salient repairing and reporting activities. Such program may also be configured to support other functions along with repairing features, such as providing back up information to which the system may revert, reversing any repair processes attempted, and obtaining accessing to an original OS system file when such file is removed from the infected system by malware or the file is damaged and cannot be repaired, among others. Finally, at 1032, the repair tool, supporting programs and/or reboot OS images may be packaged together as well as made installable and/or readily available via network access or other media.

Malware disinfecting/repairing tool largely rely on malware behavior captured information. When the analyzer OS and application environment setting is configured to the same as corporate image, malware behavior captured during analysis process is the same as if such malware run at the real corporate platform. The repair tool generated from analysis process can be sufficient to fix the infection should the malware infects the corporate computers. The invention is this patent also provides static analysis methods that reveal malware logic paths that has not been executed during analysis process. This hidden or latent behavior captured also contribute to produce more complete repair tool.

FIG. 11 is a diagram showing various illustrative aspects of exemplary intelligent reporting components and/or features, according to certain implementations. Referring to the exemplary intelligent reporting process shown, various logs may be provided as inputs to an intelligent reporting component or engine. As shown in the illustrative process of FIG. 11, a first input 1110 may comprise information from the dynamic analysis component including detail malware run time logs. Further, such information may include those logs from infected malware code that has been injected into other running processes. Addtionally, a second input 1112 may comprise information from a static analysis component and this information may include detail malware behavior logs based on latent code logic parsing. Further, such information may be derived via the reverse engineering disassembly source code and the derived logic execution graph features set forth elsewhere herein. Using such input information, an intelligent reporting process may perform a categorization routine, wherein malware behaviors are categorized and summarized into groups, such as file operation, registry operation, process operation, memory operation, and network operation, etc. Then, at 1118, the intelligent reporting process may produce one or more summary reports containing various data regarding the subject code, such as threat warning level, malware hash value, checksum information such as MD5, etc. Further, the final warning level provided in such report(s) may also take into consideration the customer's input at 1128. Here, for example, a user may provide an intelligent reporting engine with customized APIs warning level information. In connection with the detail reports and summary reports 1118, the intelligent reporting process may also directly produce alerts to IT administrators or systems 1120, which may be included into the existing security warning system. Intelligent reporting engines and/or processes herein may also provide such report information as inputs to customer's existing policy based security systems 1126. Here, for example, the reports may be configured to enable such policy based security systems to create new policy based on the malware reports. Additonally, Intelligent reporting engines and/or processes herein may also include action items in the reports and configure the reports for provision as input to components, modules or processes designed to produce repair tools, at 1130.

As set forth above, the innovations herein may be implemented via one or more software components/modules, appliances, servers, other components, or distributed between such elements. When implemented as an appliance, such an appliance may comprise either components such as a general-purpose CPU, RAM, etc. found in general-purpose computers, or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, circuitry, computing/processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: various software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of software, logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method implemented on a computing system for analyzing a sample of code for malware, the method comprising:
   performing, by an analyzer of the computing system, at least one of unpacking or decrypting the sample;
   running the sample in a native operating system (OS) environment, wherein the sample is run in parallel with one or more other samples running in respective native OS environments;
   recording behavior information indicating behavior of the sample during the running;
   reverse engineering the sample into disassembled source code;
   performing a static analysis of the disassembled source code, wherein the performing the static analysis includes comparing logic execution paths in the disassembled source code with previously executed logic execution paths indicated by the behavior information to determine latent logic execution path information associated with the disassembled source code;
   providing intelligent report information regarding the sample and each latent logic execution path in the sample, wherein the report information includes malware current payloads and any payload information regarding potential payloads that are hidden in latent code; and
   generating an intelligent report regarding the behavior of the sample.

2. The method of claim 1, further comprising classifying the sample, wherein the classifying the sample includes determining a malware family to which the sample belongs.

3. A system for analyzing a sample of code for malware, the system comprising:
   at least one processor;
   at least one memory element coupled to the at least one processor; and
   at least one module adapted, when executed by the at least one processor, to:
      perform at least one of unpacking or decrypting the sample;

run the sample in a native operating system (OS) environment, wherein the sample is run in parallel with one or more other samples running in respective native OS environments;

record behavior information indicating behavior of the sample when running;

reverse engineer the sample into disassembled source code;

perform a static analysis of the disassembled source code, wherein the static analysis is performed by comparing logic execution paths in the disassembled source code with previously executed logic execution paths indicated by the behavior information to determine latent logic execution path information associated with the disassembled source code;

provide intelligent report information regarding the sample and each latent logic execution path in the sample, wherein the report information includes malware current payloads and any payload information regarding potential payloads that are hidden in latent code; and generate an intelligent report regarding the behavior of the sample.

4. The system of claim 3, wherein the at least one module is adapted, when executed by the at least one processor, to classify the sample, wherein the sample is classified at least in part by determining a malware family to which the sample belongs.

5. At least one non-transitory computer-readable medium comprising instructions to analyze a sample of code for malware, wherein the instructions, when executed by at least one processor, cause the at least one processor to:

perform at least one of unpacking or decrypting the sample;

run the sample in a native operating system (OS) environment, wherein the sample is run in parallel with one or more other samples running in respective native OS environments;

record behavior information indicating behavior of the sample when running;

reverse engineer the sample into disassembled source code;

perform a static analysis of the disassembled source code, wherein performing the static analysis includes comparing logic execution paths in the disassembled source code with previously executed logic execution paths indicated by the behavior information to determine latent logic execution path information associated with the disassembled source code;

provide intelligent report information regarding the sample and each latent logic execution path in the sample, wherein the report information includes malware current payloads and any payload information regarding potential payloads that are hidden in latent code; and generate an intelligent report regarding the behavior of the sample.

6. The at least one non-transitory computer-readable medium of claim 5, wherein the instructions, when executed by the at least one processor, cause the at least one processor to classify the sample, wherein the sample is classified at least in part by determining a malware family to which the sample belongs.

7. A method for analyzing a sample of code for malware, the method comprising:

hosting multiple operating systems (OSes) on a multiple core central processor unit (CPU) system, wherein each OS is associated with a respective analyzer of multiple analyzers configured to run in parallel on the CPU system;

providing a native application environment for each OS in which malware may be executed;

identifying which analyzer is available to analyze the sample;

providing the sample to the identified analyzer;

performing at least one of unpacking or decrypting the sample;

running the sample in a native operating system (OS) environment associated with the identified analyzer, wherein the sample is run in parallel with one or more other samples running in respective native OS environments;

recording behavior information indicating behavior of the sample when running;

reverse engineering the sample into disassembled source code;

performing a static analysis of the disassembled source code to determine latent logic execution path information associated with the disassembled source code;

providing intelligent report information regarding the sample and each latent logic execution path in the sample, wherein the report information includes malware current payloads and any payload information regarding potential payloads that are hidden in latent code; and generating an intelligent report regarding the behavior of the sample.

8. The method of claim 7, further comprising classifying the sample, wherein the classifying the sample includes determining a malware family to which the sample belongs.

9. The method of claim 7, wherein the latent logic execution path information is determined by comparing logic execution paths in the disassembled source code with previously executed logic execution paths indicated by the behavior information.

10. A system for analyzing a sample of code for malware, the system comprising:

at least one processor;

at least one memory element coupled to the at least one processor; and at least one module adapted, when executed by the at least one processor, to:

host multiple operating systems (OSes) on a multiple core central processor unit (CPU) system, wherein each OS is associated with a respective analyzer of multiple analyzers configured to run in parallel on the CPU system;

provide a native application environment for each OS in which malware may be executed;

identify which analyzer is available to analyze the sample;

provide the sample to the identified analyzer;

perform at least one of unpacking or decrypting the sample;

run the sample in a native operating system (OS) environment associated with the identified analyzer, wherein the sample is run in parallel with one or more other samples running in respective native OS environments;

record behavior information indicating behavior of the sample when running;

reverse engineer the sample into disassembled source code;

perform a static analysis of the disassembled source code to determine latent logic execution path information associated with the disassembled source code;

provide intelligent report information regarding the sample and each latent logic execution path in the sample, wherein the report information includes malware current payloads and any payload information regarding potential payloads that are hidden in latent code; and generate an intelligent report regarding the behavior of the sample.

11. The system of claim 10, wherein the latent logic execution path information is determined by comparing logic execution paths in the disassembled source code with previously executed logic execution paths indicated by the behavior information.

12. The system of claim 10, wherein the at least one module is adapted, when executed by the at least one processor, to classify the sample, wherein the sample is classified at least in part by determining a malware family to which the sample belongs.

13. At least one non-transitory computer-readable medium comprising instructions to analyze a sample of code for malware, wherein the instructions, when executed by at least one processor, cause the at least one processor to:

host multiple operating systems (OSes) on a multiple core central processor unit (CPU) system, wherein each OS is associated with a respective analyzer of multiple analyzers configured to run in parallel on the CPU system;

provide a native application environment for each OS in which malware may be executed;

identify which analyzer is available to analyze the sample;

provide the sample to the identified analyzer;

perform at least one of unpacking or decrypting the sample;

run the sample in a native operating system (OS) environment associated with the identified analyzer, wherein the sample is run in parallel with one or more other samples running in respective native OS environments;

record behavior information indicating behavior of the sample when running;

reverse engineer the sample into disassembled source code;

perform a static analysis of the disassembled source code to determine latent logic execution path information associated with the disassembled source code;

provide intelligent report information regarding the sample and each latent logic execution path in the sample, wherein the report information includes malware current payloads and any payload information regarding potential payloads that are hidden in latent code; and generate an intelligent report regarding the behavior of the sample.

14. The at least one non-transitory computer-readable medium of claim 13, wherein the latent logic execution path information is determined by comparing logic execution paths in the disassembled source code with previously executed logic execution paths indicated by the behavior information.

15. The at least one non-transitory computer-readable medium of claim 13, wherein the instructions, when executed by the at least one processor, cause the at least one processor to classify the sample, wherein the sample is classified at least in part by determining a malware family to which the sample belongs.

* * * * *

UNITED STATES PATENT AND TRADEMARK OFFICE
CERTIFICATE OF CORRECTION

PATENT NO. : 9,213,838 B2  
APPLICATION NO. : 13/594702  
DATED : December 15, 2015  
INVENTOR(S) : Lixin Lu Page 1 of 1

It is certified that error appears in the above-identified patent and that said Letters Patent is hereby corrected as shown below:

On the title page, column 1, under Related U.S. Application Data, after line 2 of "(63) Continuation of application No. PCT/US2011/036553, filed on May 13, 2011", insert -- (60) Provisional application No. 61/321,885, filed on April 8, 2010. --

Signed and Sealed this  
Tenth Day of May, 2016

Michelle K. Lee  
*Director of the United States Patent and Trademark Office*